United States Patent [19]
Atobe et al.

[11] Patent Number: 5,841,552
[45] Date of Patent: Nov. 24, 1998

[54] IMAGE PROCESSED APPARATUS FOR PROCESSING IMAGES HAVING DIFFERENT RESOLUTIONS

[75] Inventors: Hiroshi Atobe; Atsushi Shoji, both of Yokohama, Japan

[73] Assignee: Canon Kabushiki Kaisha, Tokyo, Japan

[21] Appl. No.: 377,510

[22] Filed: Jan. 24, 1995

Related U.S. Application Data

[63] Continuation of Ser. No. 870,317, Apr. 17, 1992, abandoned.

[30] Foreign Application Priority Data

Apr. 19, 1991 [JP] Japan ................................ 3-113731
Apr. 24, 1991 [JP] Japan ................................ 3-094372

[51] Int. Cl.$^6$ .......................................... H04N 1/00
[52] U.S. Cl. ................................... 358/447; 358/505
[58] Field of Search ........................... 358/451, 447, 358/428, 429, 430, 502, 505, 448, 347, 442, 503, 462; H04N 1/00

[56] References Cited

U.S. PATENT DOCUMENTS

| | | | |
|---|---|---|---|
| 4,578,689 | 3/1986 | Spencer et al. | 346/160 |
| 4,713,701 | 12/1987 | Kawamura et al. | 358/502 |
| 4,742,363 | 5/1988 | Shiraishi | 346/108 |
| 4,816,924 | 3/1989 | Sekiya | 358/296 |
| 4,841,375 | 6/1989 | Nakajima et al. | 358/442 |
| 4,862,228 | 8/1989 | Ralph | 357/4 |
| 4,947,260 | 8/1990 | Reed et al. | 358/447 |
| 4,949,188 | 8/1990 | Sato | 358/448 |
| 4,995,103 | 2/1991 | Tsukada et al. | 358/451 |
| 5,001,575 | 3/1991 | Nakabara | 358/451 |
| 5,025,325 | 6/1991 | Hudson | 358/447 |
| 5,194,879 | 3/1993 | Kotabe et al. | 346/108 |
| 5,214,519 | 5/1993 | Faulhaber et al. | 358/451 |
| 5,274,474 | 12/1993 | Media | 358/462 |

*Primary Examiner*—Thai Tran
*Assistant Examiner*—Huy Nguyen
*Attorney, Agent, or Firm*—Fitzpatrick, Cella, Harper & Scinto

[57] ABSTRACT

An image processing apparatus includes an input device for inputting code, and a conversion device for converting the input code information to pixel information. An output device outputs the pixel information generated by the conversion device to a print unit which is capable of variably adjusting a printing resolution in a predetermined range. A specification device specifies a resolution at which an image corresponding to the input code information is to be printed, in accordance with the input code information. A setting device sets the printing resolution of the print unit as one of positive integer multiples of the specified resolution in the predetermined range.

7 Claims, 6 Drawing Sheets

FIG.3

PDL HEADER UNIT EXAMPLE
DEPEND UPON RESOLUTION

1Bh  5Bh  <TOTAL BYTE NUMBER>  3Bh  <WIDTH>  3Bh  <RESOLUTION>  3Bh  <HEIGHT>  2Fh
[ESC]  [                        ;            ;                  ;                 /

RESOLUTION { 33h  30h  30h  ·············· 300dpi
            { 34h  30h  30h  ·············· 400dpi

IMAGE PROCESSED APPARATUS FOR PROCESSING IMAGES HAVING DIFFERENT RESOLUTIONS

This application is a continuation of application Ser. No. 07/870,317 filed Apr. 17, 1992, abandoned.

BACKGROUND OF THE INVENTION

1. Field of the Invention

The present invention relates to an image processing apparatus which interprets, in addition to, for example, page description languages (PDL), a plurality of control coding schemes such as an ESC sequence of a serial printer, and outputs bitmap image data to a printing apparatus which performs printing.

2. Related Background Art

In printing apparatuses such as printers, as printing functions for printing of, for example, ruled lines, graphics, or bit images, have come to be input from a simple character printing apparatus, control coding schemes which use some special non-printing characters as control codes, have become more sophisticated and complex.

A conventional typewriter has type fonts by which characters can be directly printed. As printing apparatuses have in recent years been required to print a wide variety of characters and perform various printing operations, such as drawing complex figures, generally, figures and characters are formed by dot patterns. As a higher printer quality is now desired, the dot printing density has increased gradually because the hardware of printing apparatus has been improved.

However, the aforementioned control coding schemes are not standardized from maker to maker, or for different lines of products made by the same maker. As a result, existing control coding schemes differ from maker to maker or from application to application.

In recent years, various kinds of application software has been developed and widely used. However, each application software cannot be applied to every control coding scheme and therefore it can output to only a limited number of different types of printing apparatuses. For this reason, it has been desired that one printing apparatus work with a plurality of control coding schemes. As a result, each recent printing apparatus has had to cope with the above problem in some form or other, for example, emulator software is provided for the apparatus.

What is problematical, is that these control coding schemes have portions which depend upon the printing density of a machine developed during the initial printer development period. Since, at the present time, application software which is closely associated with such control coding schemes and which assumes a specific printing density has come to be widely used, even if the resolution of a printing apparatus is improved, problems are likely to arise when processes related to graphics are performed if a ratio of the printing density based on the control coding scheme to that of the printing apparatus deviates from a simple ratio. This is also disadvantageous as regards processing speed.

For this reason, even if a page printer which is capable of outputting a high-quality image at 300 dpi is used, when printing is performed on the basis of the print data of the control coding scheme which is made with a wire dot scheme of approximately 160 dpi as a reference, problems arise in that the image is distorted, for example, ruled lines deviate or the thickness of each line is printed differently from the original one. Therefore, the features of the page printer cannot be utilized.

In a printer which emulates a plurality of control coding schemes, a method can be considered in which the resolution is changed in accordance with the control coding scheme to be emulated, that is, resolutions can be changed by a command from a host computer or by dip switches disposed in the printer's main body.

However, in the above-described method, a user who uses printers has to always be concerned about the relationship between the type of the control coding scheme used and the resolution. Thus, there is a problem that the user is burdened with the very laborious operation of switching resolutions.

In actual printers, it is not practical to provide a mechanism for changing printing density at will. In a case where the printing density falls within a range which varies by 30 to 40% in a laser printer which is produced assuming that printing is performed at, for example, approximately 300 dpi, no particular optical adjustment of a spot system of a light beam is required, and a changing of a printing density can be realized by adjusting the rotational speed of a polygon mirror. However, when printing having a density of +100% to −50% of its originally assumed printing density is performed, a mechanism for changing the spot diameter of a light beam must be provided, and as regards the hardware thereof, laser driving circuits, logic operating circuits or the like become costly.

SUMMARY OF THE INVENTION

The present invention has been achieved to solve the above-mentioned problems of the prior art.

An object of the present invention is to provide an image processing apparatus which is capable of processing print data of a plurality of control coding schemes.

Another object of the present invention is to improve the handling and usefulness of the image processing apparatus which is capable of processing print data of a plurality of control coding schemes.

A further object of the present invention is to provide an image processing apparatus which is capable of printing a high-quality image even when print data of any one of a plurality of control coding schemes is input the apparatus.

A still further object of the present invention is to provide an image processing apparatus which is capable of automatically setting a resolution most suitable for output information coded in each page description language to a printer engine by analyzing the type and the resolution information of a control coding scheme of received printing information.

In the present invention, when printing information is received from an external unit, determination means analyzes the received printing information and determines the type and the resolution information of the control coding scheme. Control means switches the resolution on the basis of each control coding scheme and the type and the resolution information of the determined control coding scheme so that a resolution most suitable for the output information coded in each control coding scheme can be automatically set in a printer engine.

In addition, the control means controls switching means so that the highest resolution can be set into a printer engine on the basis of the type of the control coding scheme determined by the determination means, making it possible to automatically set a resolution most suitable for each control coding scheme into the printer engine.

In a printing apparatus according to the present invention, such as a laser printer which is capable of adjusting a printing density, a printing density most suitable for each control coding scheme is stored and the printing density is selected, making it possible to realize a high-quality printing output for any control coding scheme at any time.

In the present invention, a limited range of the printing density of a printing mechanism is adjusted, and the remaining portions are dealt with by software.

A maximum value which falls within the adjustable range of the printing mechanism is selected as the printing density and image development density from among multiples of the printing density based on the control coding scheme to which received print data belong, and a graphic drawing is performed. At this time, an interpolation operation is performed on a bit image and the like, the accuracy of the output depending upon a specific resolution.

In case of a laser printer using a printing mechanism which is designed assuming printing to be performed at, for example, approximately 300 dpi during printing under a control code produced for an impact printer of 160 dpi, a printing density of 320 dpi which is twice 160 dpi is stored as a corresponding printing density. Drawing and interpolation operations are performed at this printing density, and thereafter printing is performed.

In the printing industry, a length unit of approximately 1/72 inch, which is called a point, is sometimes used as a unit system. Page description languages which use 72 dpi as a reference unit have been developed in response to this point length. During printing using such a page description language, a printing density of 360 dpi, which is five times 72 dpi, is stored as a corresponding printing density, and then drawing, printing and interpolation operations are performed at 360 dpi. The printing density of a printer engine is changed on the basis of the control coding scheme used in the above-described manner, an optimum value is selected, and at the same time the size of a page memory is changed in accordance with the number of printing pixels. Thus, a high-quality printing output can be provided.

The aforementioned and other objects, features and advantages of the present invention will become clear when reference is made to the following description of the preferred embodiments of the present invention, together with reference to the accompanying drawings.

DETAILED DESCRIPTION OF THE PREFERRED EMBODIMENTS

Preferred embodiments of the present invention will be explained below in detail with reference to the accompanying drawings.

(First Embodiment)

Figure 1:
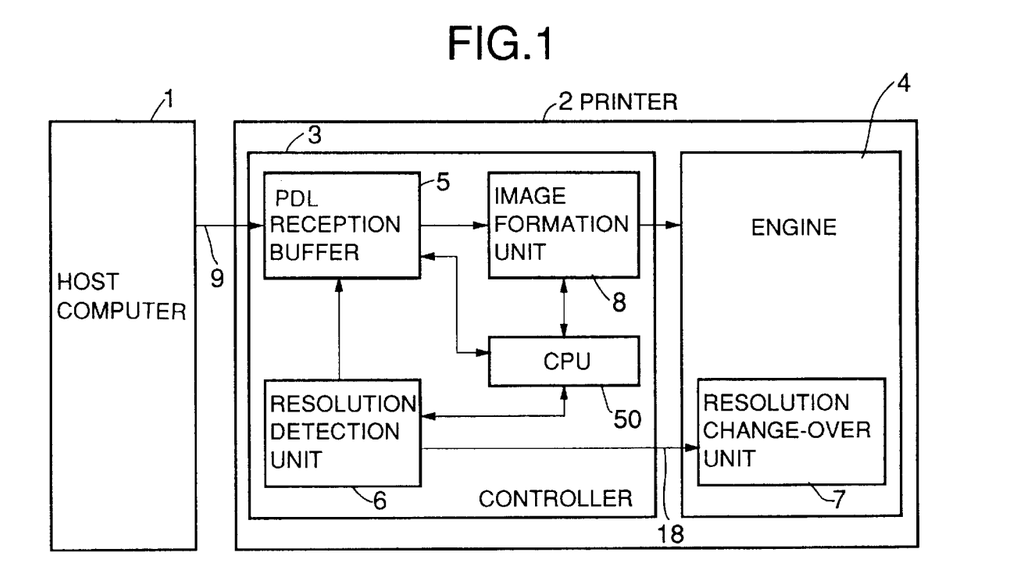
FIG. 1 is a block diagram illustrating the construction of a recording apparatus according to the first embodiment of the present invention.

FIG. 1 is a block diagram illustrating the construction of a recording apparatus according to the first embodiment of the present invention.

In FIG. 1, reference numeral 1 denotes a host computer, which is an external apparatus; reference numeral 2 denotes a printer; reference numeral 3 denotes a controller disposed in the printer 2; reference numeral 4 denotes a printer engine (engine); reference numeral 5 denotes a PDL reception buffer in which received PDL codes sent from the host computer 1 are temporarily stored; reference numeral 6 denotes a resolution determination unit for determining the printer resolution specified in the PDL from the header portion of the PDL codes temporarily stored in the PDL reception buffer 5; and reference numeral 7 denotes a resolution switching unit for switching the resolution of the printer engine 4 on the basis of the resolution determined by the resolution determination unit 6. The resolution switching unit 7, for example, switches each of the driving units of the printer engine 4 to change the resolution in such a way that the scanning speed (the scanning speed of a system for deflection scanning a light beam) of a polygon mirror which determines the resolution in a main scanning direction and the transporting speed of a paper are switched. Means for scanning an optical beam for exposure is not limited to the aforementioned polygon mirror. Other exposing means may be used for a recording apparatus, and the resolution in a main scanning direction can be switched by other well-known switching methods.

Reference numeral 8 denotes an image formation unit for interpreting PDL sent out from a host computer 1 and forming images; and reference numeral 50 denotes a CPU which controls the printer engine 4 in accordance with control programs (including a resolution switching control unit which will be described later) stored in a ROM (not shown).

The operation of the apparatus shown in FIG. 1 will be explained below.

The host computer 1 sends a printer controlling code 9 to the printer 2. The printer 2 interprets the printer controlling code 9 sent from the host computer 1 and forms an image on a sheet of paper as a final step. The type of page description language which can be received by the printer 2 is a PDL which can be interpreted by the printer 2. Making it possible to interpret a specific page description language is generally called emulation. An explanation will now be given, assuming that, in this embodiment, PDLs which can be emulated by the printer 2 are only sent from the host computer 1.

The received printer controlling code 9 is temporarily stored in the PDL reception buffer 5 in the controller 3. The resolution determination unit 6 determines the type and the resolution of the PDL by performing pattern matching with the header portion of the PDL stored in the PDL reception buffer 5. Reference numeral 18 denotes a switching control signal.

Figure 2:
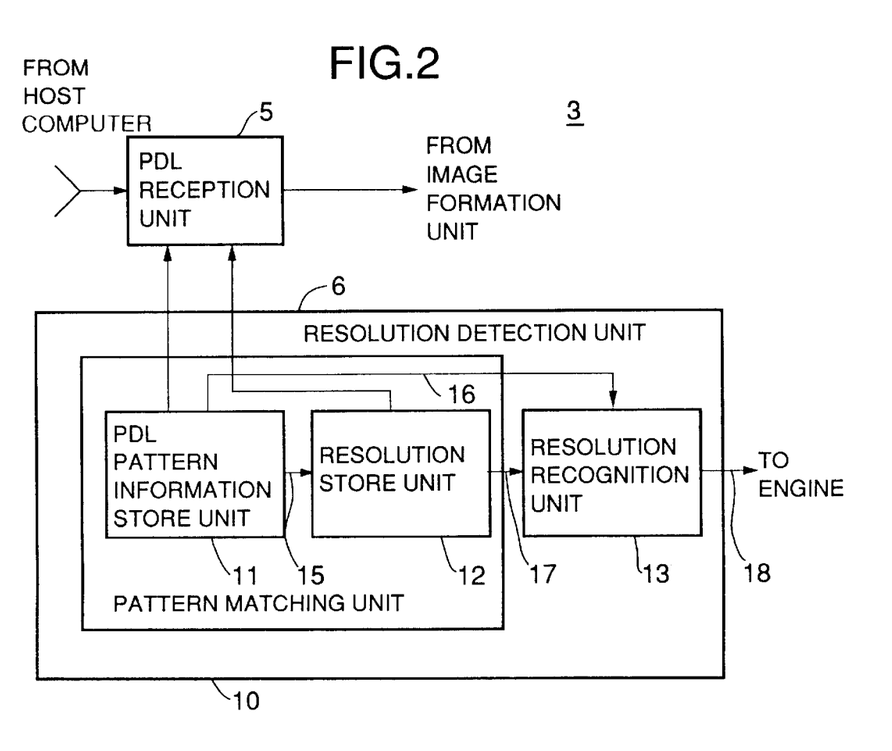
FIG. 2 is a block diagram illustrating the detailed construction of a controller shown in FIG. 1.

FIG. 2 is a block diagram illustrating the detailed construction of the controller shown in FIG. 1.

Figure 3:
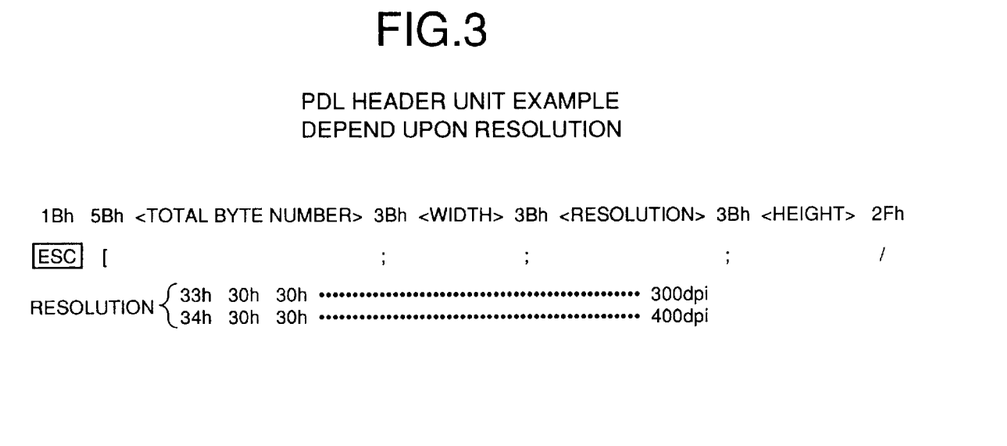
FIG. 3 is a view illustrating an example of a header portion of a PDL received in a PDL reception buffer shown in FIG. 2.

In this figure, reference numeral 10 denotes a pattern matching unit; and reference numeral 11 denotes a PDL pattern information storage unit, in which pattern information used for pattern matching to determine the type of a page description language (PDL) is stored. Each page description language is usually written according to its respective format. The header section is also written according to a predefined format in a form in which specific image information is contained. The specific image information differs from page description language to page description language. An example thereof is shown in FIG. 3.

Reference numeral 12 denotes a resolution information storage unit, which determines the resolution by performing pattern matching with the resolution information in the header section in the PDL reception buffer 5. Reference numeral 13 denotes a resolution recognition unit, which recognizes the resolution specified in the page description language on the basis of a result signal 17 output from the resolution information storage unit 12 or a result signal 16 output from the PDL pattern information storage unit 11, and outputs a switching control signal 18 to the resolution switching unit 7.

In the recording apparatus constructed as described above, when printing information is received from the external apparatus (the host computer 1), the determination means (the resolution determination unit 6) analyzes the received printing information to determine the type and the resolution information of the page description language, and the control means (the CPU 50) causes switching means (the resolution switching unit 7) to switch the resolution on the basis of each page description language and the resolution information. Thus, an automatic setting of a resolution most suitable for the output information coded by each page description language into the printer engine 4 is made possible.

The control means (the CPU 50) controls the switching means so that a highest resolution is set into the printer engine 4 on the basis of the type of each page description language determined by the determination means (the resolution determination unit 6), making it possible to automatically set a resolution most suitable for each page description language into the printer engine 4.

FIG. 3 is a view illustrating an example of a header portion of a PDL received in a PDL reception buffer 5 shown in FIG. 2. The header portion shown in FIG. 3 corresponds to the case of a page description language, in which resolution information is included.

As shown in FIG. 3, in the header portion, the total number of bytes, width, resolution, height or the like are delimited by delimiter codes 1Bh, 5Bh, 3Bh, and 2Fh. As regards the total number of bytes, the total amount of image information to be output is shown in the form of the number of bytes. As regards the width, the length in the direction of the x axis of an image to be output is shown in the form of the number of pixels. As regards the resolution, the resolution of an image to be output is shown, and it is made into a code sequence of, for example, a code sequence of 33h30h30h at 300 dpi, and a code sequence of, for example, a code sequence of 34h30h30h at 400 dpi. As regards the height, the length in the direction of the y axis of an image to be output is shown in the number of pixels.

Figure 4:
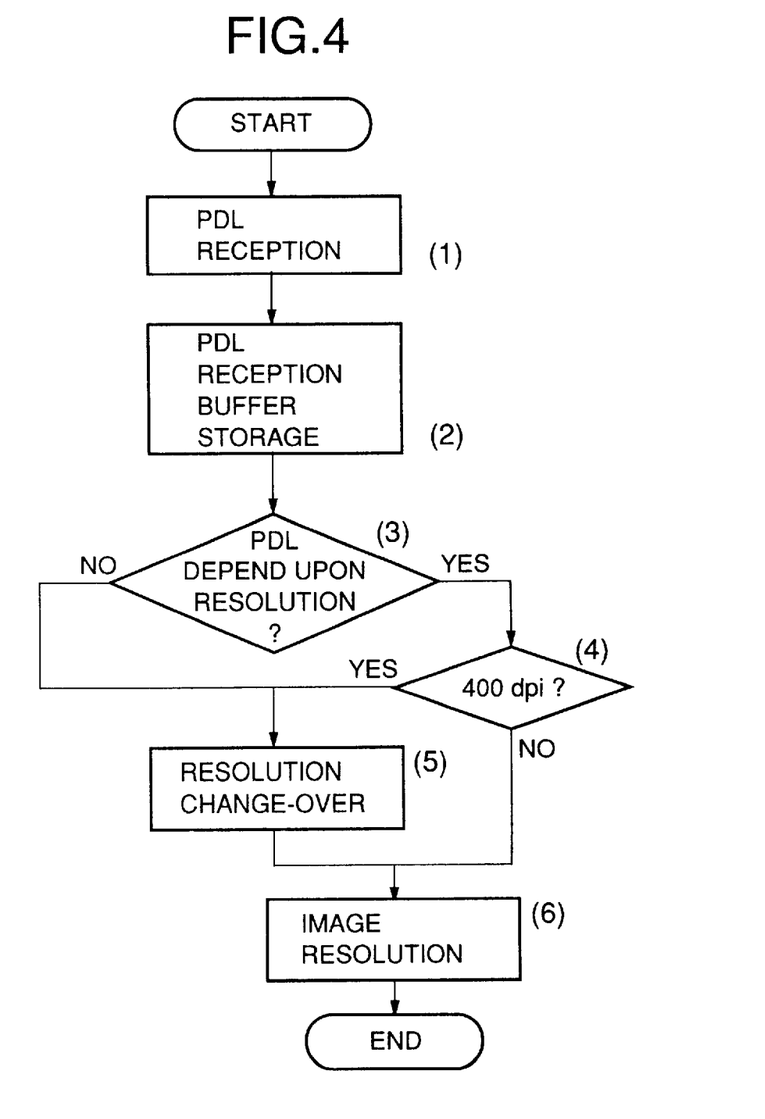
FIG. 4 is a flowchart illustrating an example of the first predetermined sequence in which a recording density is automatically switched in the recording apparatus of the present invention.

FIG. 4 is a flowchart illustrating an example of the first predetermined sequence in which a recording density is automatically switched in the recording apparatus of the present invention. Numerals (1) to (6) each denote respective steps of the sequence. In this embodiment, 300 dpi is set in the printer 2 as a default value.

The controller 3 in the printer 2 receives the printer controlling code 9 sent out from the host computer 1 (step 1). Then, the received printer controlling code 9 is temporarily stored in the PDL reception buffer 5 (step 2). Next, the type of the printer controlling code 9 is determined by using the pattern stored in the PDL pattern information storage unit 11 with respect to the header of the printer controlling code 9 stored in the PDL reception buffer 5.

After the type of the printer controlling code 9 is determined, in a case where the determined printer controlling code 9 depends upon the resolution, a result signal 15 is used to notify the user of this fact, and in a case where the determined printer controlling code 9 does not depend upon the resolution (for example, a page description language is a Postscript), a result signal 16 is used to notify the user of this fact. The resolution information storage unit 12 receiving the result signal 15 determines the resolution by performing pattern matching with the resolution information in the header portion in the PDL reception buffer 5 (in case of 300 dpi, the resolution is determined from a code sequence of, for example, 33h30h30h; in case of 400 dpi, from a code sequence of, for example, 34h30h30h) (step 3). The result of the determination by the resolution information storage unit 12 is sent out to the resolution recognition unit 13 in the form of a result signal 17. The resolution recognition unit 13 recognizes the resolution specified by the printer controlling code 9 on the basis of the result signal 16 or 17. Next, it is determined in step 4 whether the resolution recognized on the basis of the result signal 17 is 400 dpi. When the resolution is 400 dpi, a switching control signal for switching the default resolution 300 dpi to 400 dpi is sent out to the resolution switching unit 7 of the printer engine 4. When the resolution recognition section 13 receives the result signal 16, that is, when the printer controlling code 9 does not depend upon the resolution as when the page description language is a Postscript (when the resolution recognized on the basis of the result signal 17 is not 400 dpi in step 3), the resolution recognition section 13 sends out a switching control signal 18 for switching 300 dpi to 400 dpi to the resolution switching unit 7 of the printer engine 4. The resolution switching unit 7, in response to the reception of the switching control signal 18, switches the resolution from 300 dpi to 400 dpi (step 5), and the printer engine 4 forms an image based on the switched resolution (step 6). Although in this embodiment a switching operation from 300 dpi to 400 dpi has been explained, the resolution is not limited to these numerical values.

(Second Embodiment)

Figure 5:
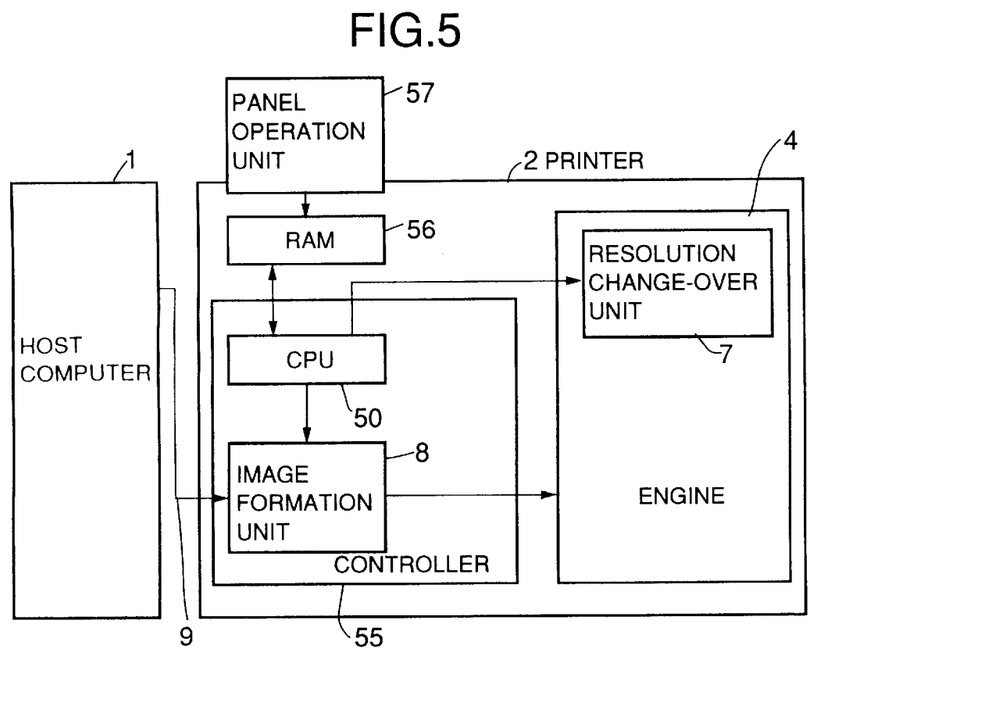
FIG. 5 is a block diagram illustrating the construction of a recording apparatus according to the second embodiment of the present invention.

FIG. 5 is a block diagram illustrating the construction of a recording apparatus according to the second embodiment of the present invention. Those components in FIG. 5 which are the same as corresponding components in FIG. 1 are given the same reference numerals.

In this figure, reference numeral 57 denotes a panel operation unit from which a user selects a PDL to be emulated, an interface or the like; reference numeral 55 denotes a controller; and reference numeral 56 denotes a RAM for storing parameters specified via the panel operation unit 57. The printer engine 4 supports resolutions of 300 dpi and 400 dpi, and these resolutions can be switched.

Figure 6:
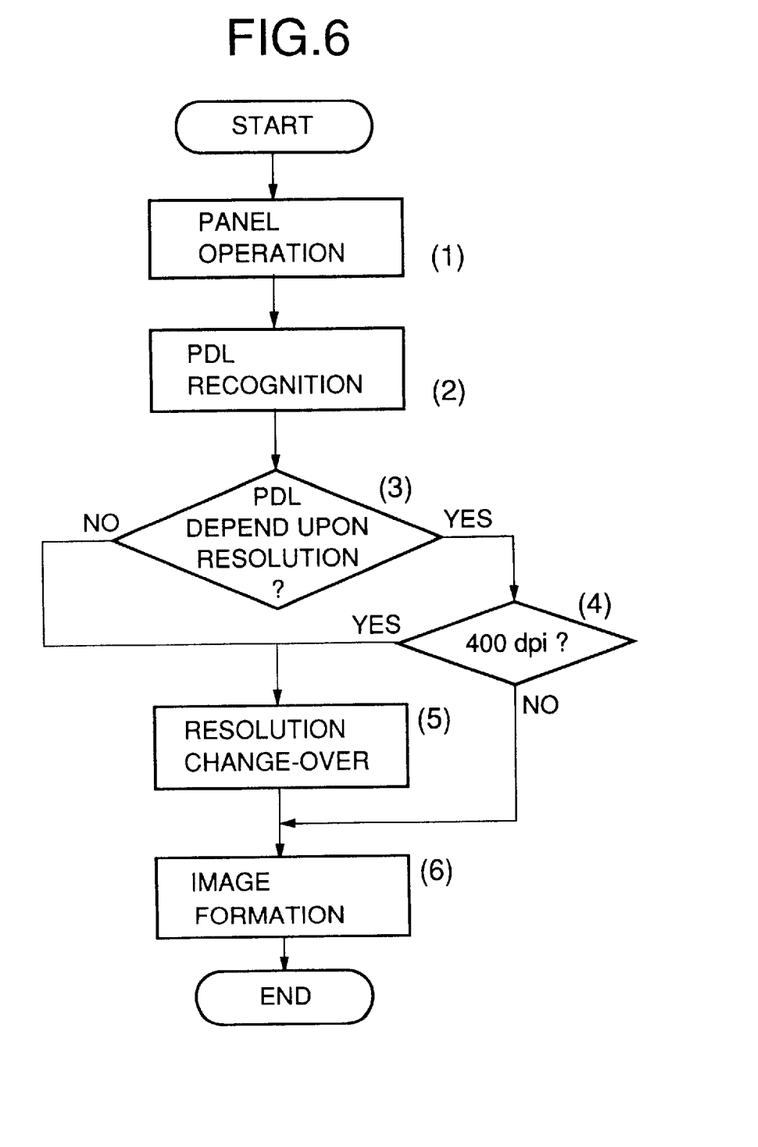
FIG. 6 is a flowchart illustrating an example of the second predetermined sequence in which recording density is automatically switched in the recording apparatus of the present invention.

FIG. 6 is a flowchart illustrating an example of the second predetermined sequence in which a recording apparatus is automatically switched in the recording apparatus according to this embodiment. Numerals (1) to (6) each denote respective steps of the sequence.

When a page description language to be emulated is selected and specified by a user via the panel operation unit 57 (step 1), the specified page description language to be emulated is stored in a RAM 56 as a parameter. Next, a CPU 50 recognizes the page description language to be emulated from the parameter in the RAM 56 (step 2). After the CPU 50 recognized the page description language to be emulated from the parameter, the CPU 50 determines whether or not the page description language depends upon the resolution of the printer engine 4 (step 3). When the page description language depends upon the resolution, it is determined whether the resolution is 400 dpi or not (step 4). When the resolution is 400 dpi, the printer engine 4 is notified to switch from a default 300 dpi to 400 dpi in response to the switching control signal 18, and the resolution is switched (step 5). An image begins to be formed at 400 dpi (step 6). When the resolution is not 400 dpi, an image begins to be formed at 300 dpi.

On the other hand, when the page description language does not depend upon the resolution of the printer engine 4, for example, when the page description language is a Postscript (step 3), the resolution is switched to the highest resolution of the printer engine 4, that is, 400 dpi in this embodiment, and an image begins to be formed at 400 dpi (step 6).

In this embodiment, the resolution is switched on the basis of the page description language specified via the panel operation unit 57. Indication means, such as dip switches or switches, may be used for selection specification means in the panel operation unit 57, but the indication means is not limited to these means. Although in the above-described embodiment of the present invention, a recording apparatus which is capable of selecting the resolution of one of either 300 dpi or 400 dpi has been explained, the present invention can be effectively applied to a recording apparatus capable of switching much more resolutions, for example, a plurality of resolutions of 240 dpi, 300 dpi, 400 dpi or 480 dpi. Thus, notable advantages can be obtained.

In the present invention, as described above, disposed are switching means for causing a printer engine to be switched to a plurality of resolutions; determination means for detecting the type and resolution information of a page description language by analyzing received printing information; and control means for controlling the switching of resolutions by means of the switching means on the basis of each page description language and the resolution information determined by this determination means. As a result, an operation for specifying and inputting the type and resolution information of a page description language during a printing operation is unnecessary, thereby relieving an operator of the burden of a laborious operation.

Since the control means is constructed in such a way that it controls the switching means so as to set the highest resolution to the printer engine on the basis of each type of a page description language determined by the determination means, output information coded by a page description language which is independent of a resolution can at any time be printed at a high resolution. As a result, there is an advantage in that an operation for printing output information which is input can be started instantly without being concerned about the relationship between the type and the resolution of a page description language.

(Third Embodiment)

Figure 7:
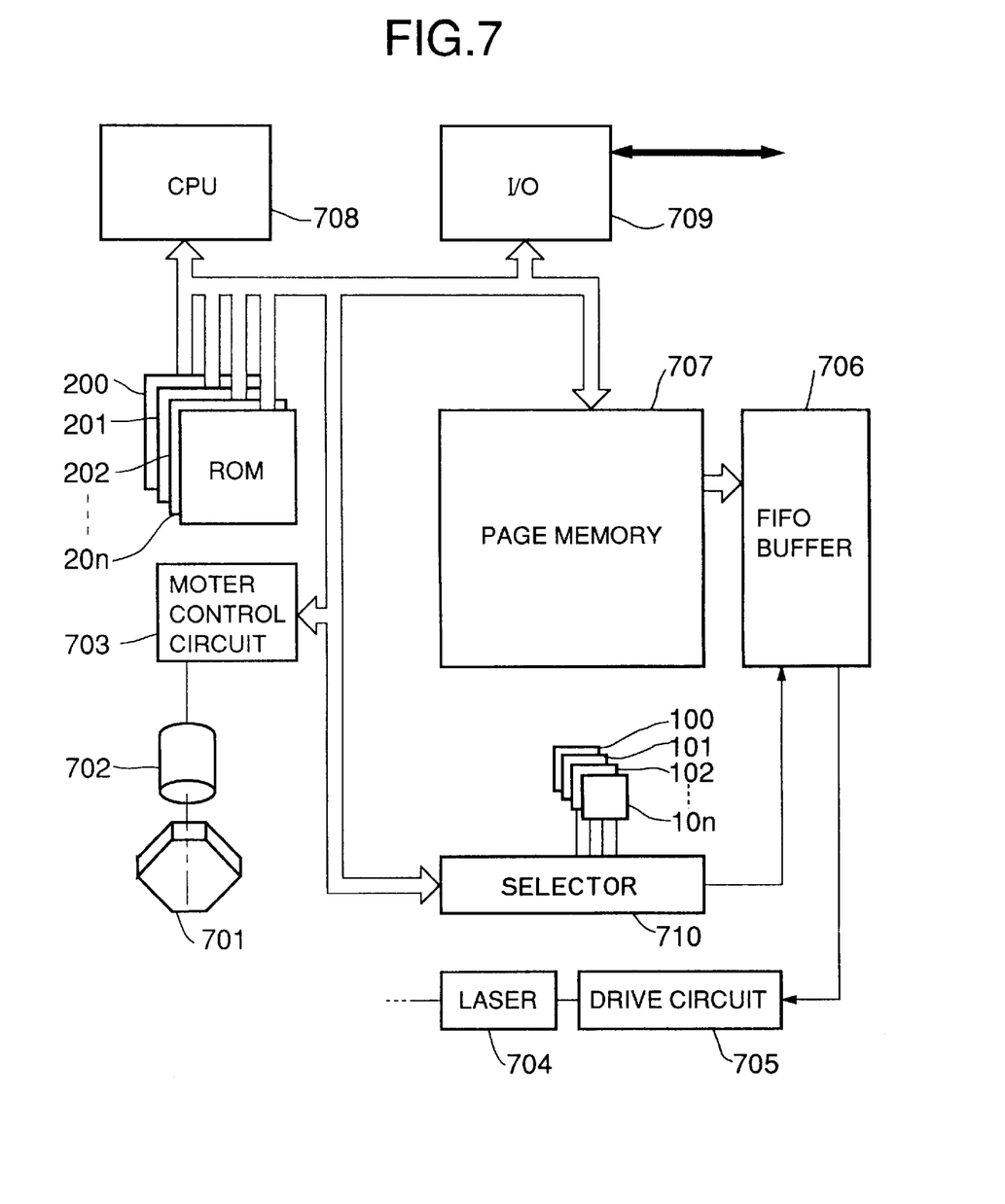
FIG. 7 is a block diagram of the third embodiment of the present invention.

FIG. 7 is a block diagram of the third embodiment of the present invention. In this block diagram, an optical scanning type laser printer is used as a printing apparatus capable of changing the scanning density.

Reference numeral 701 denotes a polygon mirror for performing scanning; reference numeral 702 denotes a motor for driving the polygon mirror; and reference numeral 703 denotes a motor control circuit for controlling the rotational speed of the motor. The scanning speed of the polygon mirror is changed as a result of supplying a signal indicating a proper control signal to the motor control circuit 703. Reference numeral 704 denotes a laser element for generating a laser beam with which a light sensitive body is scanned; and reference numeral 705 denotes a drive circuit for activating the laser element 704.

Reference numeral 706 denotes a FIFO buffer through which image signals are sent out; reference numerals 100 to 10n denote pixel clock generators by which the printing density in a main scanning direction is changed by changing a pixel clock, including correction of pixels by a change in the scanning density. Reference numeral 707 denotes a storage area in which a page memory from which an image is formed is placed; and reference numeral 708 denotes a CPU for performing drawing in accordance with various kinds of coding schemes. This CPU 708 reorganizes the size of the page memory in accordance with the required number of printing pixels each time the printing density is changed, and adjusts a coordinate conversion parameter of a drawing routine.

Reference numerals 200 to 20n each denote a ROM in which programs which interpret a printing control coding scheme are stored. A control coding scheme to be used first is determined by some programs contained in these ROMs.

A program selects a ROM for interpreting a control coding scheme to be used and a program for interpreting each control code placed in a specific address within a ROM in accordance with an internal setting or an instruction from outside. The printing density of a printer engine such as the scanning density or a pixel clock is selected on the basis of the storage of the printing density corresponding to the selected control coding scheme.

Reference numeral 709 denotes an input/output unit (I/O) through which various kinds of character codes used for printing and control are sent to or received from external apparatuses such as personal computers. The printing density in a sub-scanning direction is changed by a CPU controlling the rotational speed of the motor control circuit 703, which change is performed by changing the scanning density in the direction in which paper is fed. At the same time, the printing density in the direction of the main scanning is changed. The changing of the printing density in the direction of the main scanning is performed by simply selecting one clock used to send pixels by using a selector 710 from among different reference frequencies of 100 to 10n.

The CPU 708 determines a control coding scheme to be used on the basis of data sent from an external apparatus in such a way that a maximum value in an adjustable range of the printing mechanism is determined as the printing density from among integer multiples of the printing density which it is assumed that the control coding scheme will be used. The frequency of a quartz crystal which is a reference of a pixel clock during the sending out of an image, and the rotational speed of a polygon mirror, are selected.

After the setting of the printing mechanism is completed, the CPU 708 performs a drawing operation. In case of a ordinary characters, printing is performed by developing outline characters or selecting characters having a number of dots which become the same size as the character specified in the control coding scheme. As regards graphics such as line drawing or arc drawing, scale adjustment is made so that a correct character size can be obtained and printing is performed.

When a bitmap image or external characters are printed, the printing is performed after an interpolation operation is performed by making full use of the resolution.

(Fourth Embodiment)

Figure 8:
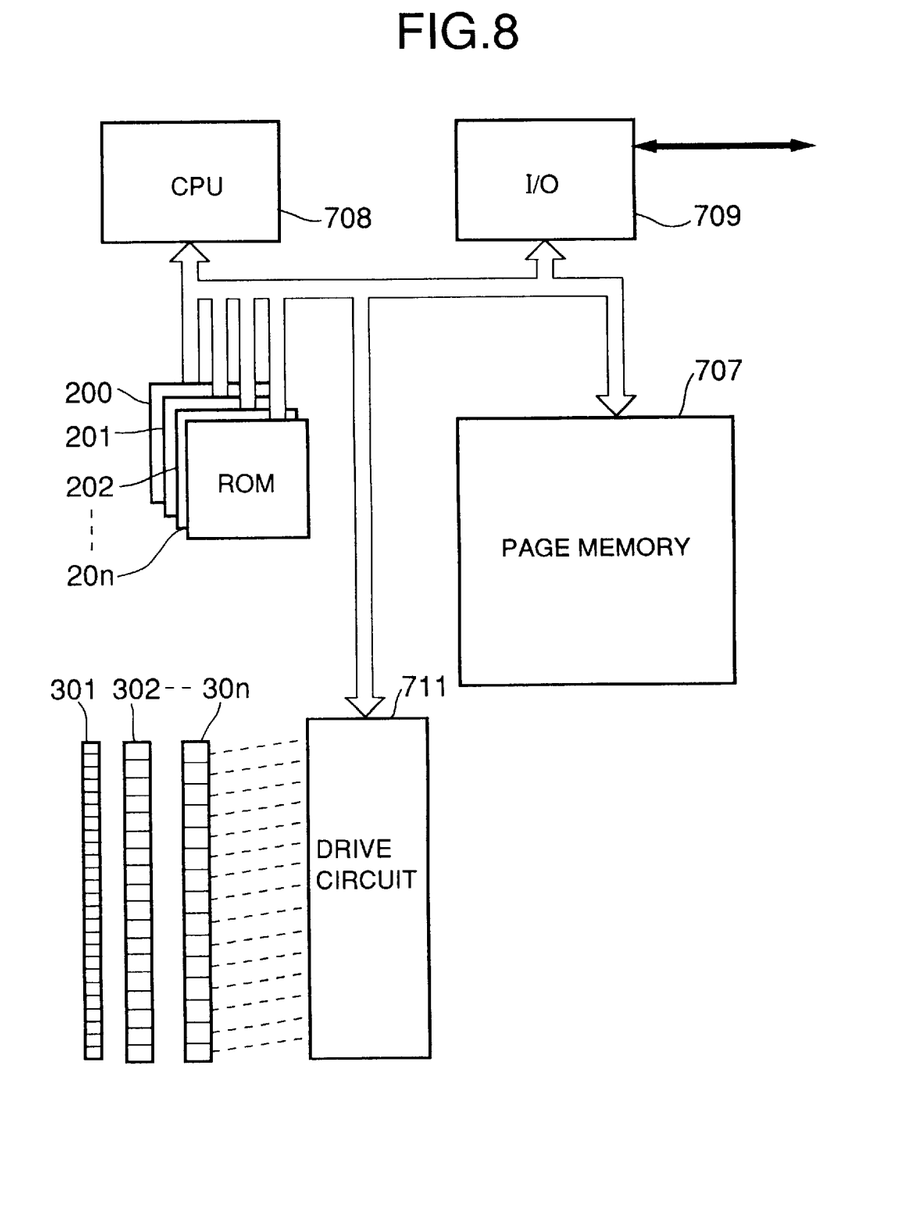
FIG. 8 is a block diagram of the fourth embodiment of the present invention.

The construction of a liquid crystal printer having a plurality of shutters having a plurality of different line densities according to the fourth embodiment of the present invention will now be explained.

In the printing mechanism of a fixed head, a plurality of printing heads are needed to form a head having a plurality of line densities. In an LED printer, this becomes highly costly and increases the size of the LED printer. In the liquid crystal shutter method, it is comparatively easy to form a plurality of shutter rows on one panel and there is no substantial difference in size. Furthermore, it is easy to change respective shutter densities. Therefore, the liquid crystal printer is advantageous in terms of cost and size, and can be easily realized.

Reference numerals 301 to 30n each denote a liquid crystal having different line densities in the vertical and horizontal directions of a liquid crystal window; reference numeral 711 denotes a circuit for activating the liquid crystal shutter. A shutter row to be driven is selected according to the control coding scheme to be used, and the printing density is determined. At the same time, the printing density in the direction in which paper is fed is controlled on the basis of the time during which the shutter is open, and the line density of the shutter is selected. As a result, the printing density in a direction perpendicular to the paper feeding is determined. After the setting of the printing mechanism is completed, a drawing operation is performed in the same manner as the third embodiment, and an interpolation operation is performed, as required.

According to the present invention, the highest printing density which can be used in a printing mechanism from among printing densities corresponding to a control coding scheme is selected, and a drawing operation is performed. For bitmap images, the best printing output on the printing system can be obtained by performing an interpolation operation thereon. In addition, since the interpolation operation is an operation of an integer ratio, a high-quality image can be formed by a simple mechanism.

Any combination of the above-described first to fourth embodiments can be made, and this is within the scope of the present invention.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included with the spirit and scope of the appended claims.

What is claimed is:

1. An image processing apparatus comprising:

input means for inputting input information describing an image;

conversion means for converting the input information into pixel information;

specification means for specifying a resolution, at which the image is to be printed, in accordance with the input information for the image;

a print unit having a plurality of light scanning means in which a plurality of cells are arranged on a line, with a density of cells in each of said light scanning means being different from one another, wherein the printing resolution is variably adjusted by selectively using one of said plurality of light scanning means; and setting means for setting a printing resolution of said print unit which variably adjusts a printing resolution in a predetermined range of resolutions, with said setting means setting a printing resolution as one of the specified resolution and a different resolution, wherein when the specified resolution is lower than the predetermined range, said setting means sets, as the printing resolution of said print unit, i times the specified resolution (i being an integer $\geq 2$) in the predetermined range of resolutions.

2. An image processing apparatus according to claim 1, wherein said input means can input a plurality of types of the input information and the specified resolution corresponds to the type of the input information.

3. An image processing apparatus according to claim 1, wherein when the specified resolution is lower than the predetermined range, said setting means sets a maximum positive integer multiple of the specified resolution in the predetermined range.

4. An image processing apparatus according to claim 1, further comprising means for determining the type of the input information, wherein the specified resolution corresponds to the determined type.

5. An image processing apparatus according to claim 1, wherein the input information includes a control code indicative of a printing resolution at which the image is to be printed, and said specification means comprises means for storing a plurality of control codes, each such control code specifying a different printing resolution and specifies a printing resolution at which the image is to be printed by comparing the control code of the input image information with each of the stored control codes.

6. An image processing apparatus comprising:

input means for inputting a plurality of types of input information;

determination means for determining the type of the input information, which input formation is dependent on, or independent of a resolution;

conversion means for converting the input information into pixels information;

a print unit having a plurality of light scanning means in which a plurality of cells are arranged on a line, with a density of cells in each of said light scanning means being different from one another, wherein the printing resolution is variably adjusted by selectively using one of said plurality of light scanning means; and setting means for setting the printing resolution of said print unit which prints at one of a plurality of printing resolution, wherein when the determined type of the input information is independent of resolution, said setting means setting a maximum resolution at which printing is performed by said print unit.

7. An image processing apparatus according to claim 6, wherein said setting means includes means for storing a table representing a relationship between the type of the input information and a resolution at which an image corresponding to the input information is to be printed.

* * * * *

UNITED STATES PATENT AND TRADEMARK OFFICE
CERTIFICATE OF CORRECTION

PATENT NO. : 5,841,552

DATED : November 24, 1998

INVENTOR(S) : HIROSHI ATOBE ET AL.

Page 1 of 2

It is certified that error appears in the above-identified patent and that said Letters Patent is hereby corrected as shown below:

ON TITLE PAGE

[54] Title: "PROCESSED" should read --PROCESSING--.

[56] U.S. Patent Documents:
"Nakabara" should read --Nakahara--.

IN THE DRAWINGS

Sheet 5 of 6 "MOTER" should read --MOTOR--.

COLUMN 1 line 1, "PROCESSED" should read --PROCESSING--; and
line 49, "problematical," should read --problematic,--.

COLUMN 2 line 42, "input" should read --input to--.

COLUMN 3 line 14, "like," should read --like, with--.

UNITED STATES PATENT AND TRADEMARK OFFICE
CERTIFICATE OF CORRECTION

PATENT NO. : 5,841,552
DATED : November 29, 1998
INVENTOR(S) : HIROSHI ATOBE ET AL.

It is certified that error appears in the above-identified patent and that said Letters Patent is hereby corrected as shown below:

COLUMN 5 line 48,   "3Bh," should read --3Bh--.

COLUMN 8 line 57,   "a" should be deleted (second occurrence).

COLUMN 9 line 5,   "explained." should read --explained with reference to FIG. 8.--.

COLUMN 10 line 45,   "pixels" should read --pixel--; and
   line 54,   "resolution," should read --resolutions,--.

Signed and Sealed this

Seventeenth Day of August, 1999

Attest:

Q. TODD DICKINSON

*Attesting Officer*     *Acting Commissioner of Patents and Trademarks*